Jan. 4, 1927.
J. M. THOMPSON ET AL
1,612,842
PIPE CLEANING APPARATUS
Filed May 13, 1925    2 Sheets-Sheet 1
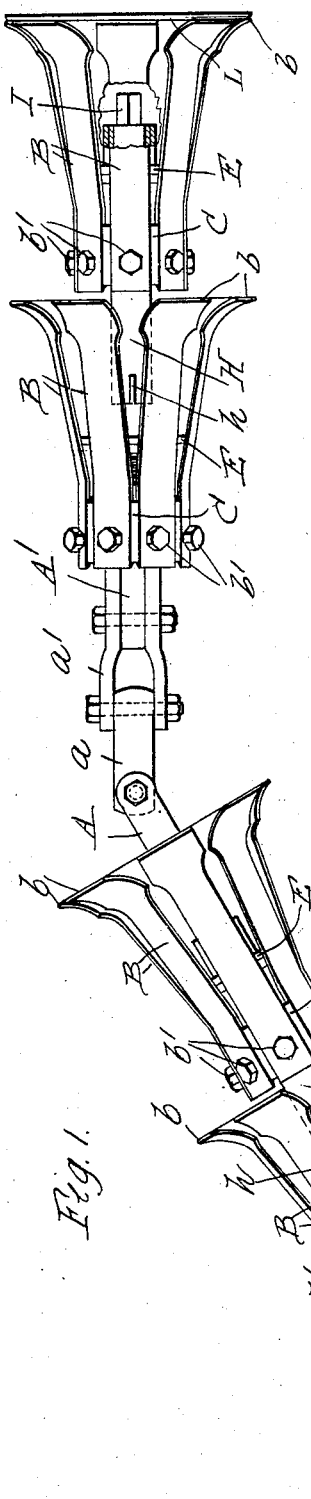
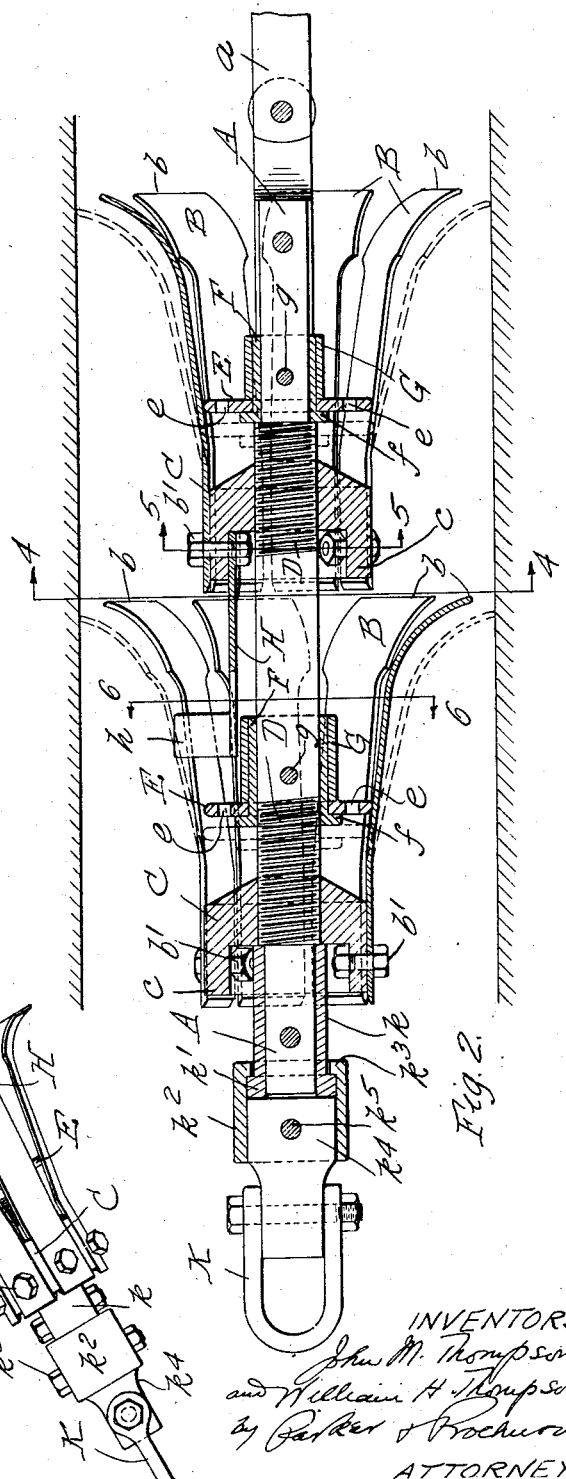
INVENTORS.
John M. Thompson
and William H. Thompson
by Parker & Brochures.
ATTORNEYS Jan. 4, 1927.  1,612,842
J. M. THOMPSON ET AL
PIPE CLEANING APPARATUS
Filed May 13, 1925   2 Sheets-Sheet 2
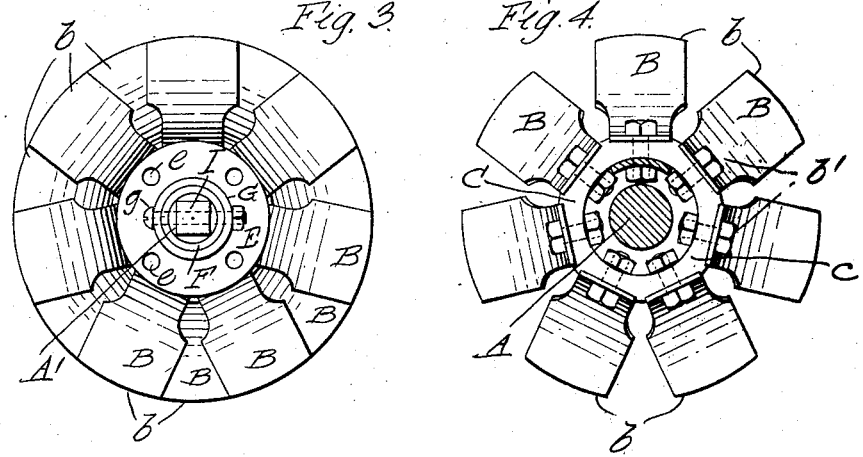
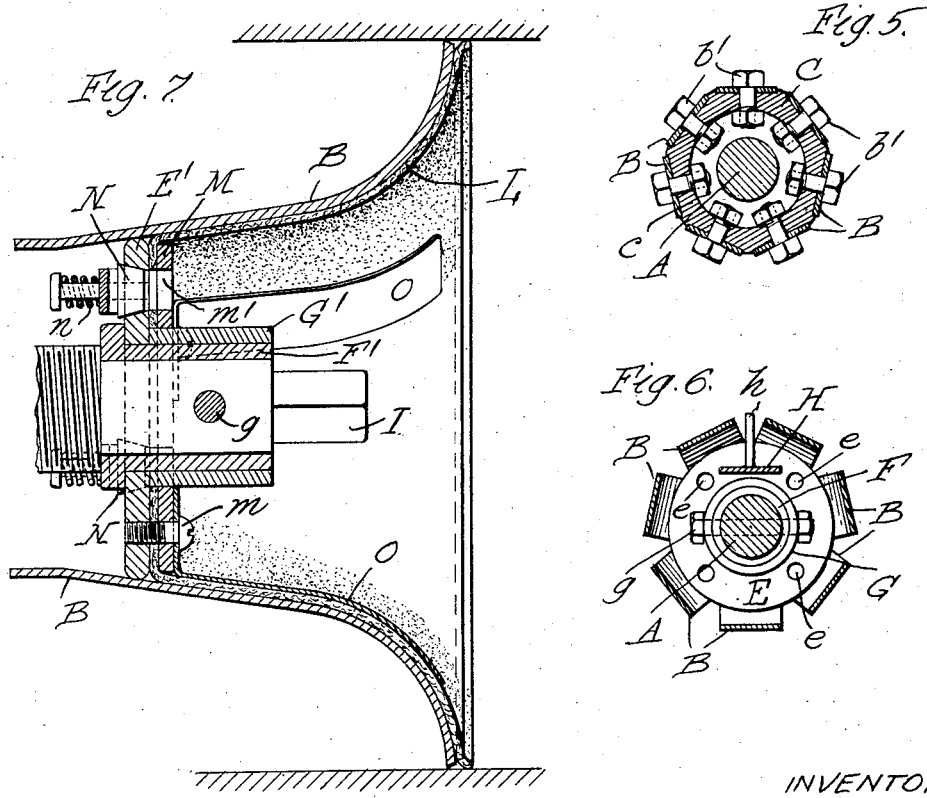
INVENTORS
John M. Thompson
and William H. Thompson
By Parker & Brochnow
ATTORNEYS Patented Jan. 4, 1927.

1,612,842

UNITED STATES PATENT OFFICE.

JOHN M. THOMPSON AND WILLIAM H. THOMPSON, OF BUFFALO, NEW YORK.

PIPE-CLEANING APPARATUS.

Application filed May 13, 1925. Serial No. 29,921.

This invention relates to apparatus for cleaning pipe lines or conduits, such as are commonly used for conducting water, sewage, oil and the like.

The objects of this invention are to provide an apparatus of this kind which is so constructed that the apparatus will at all times act upon the entire inner surface of the pipe which is being cleaned; also to provide improved means for adjusting the scrapers for the purposes of varying the tension with which the scrapers act on the inner surface of the pipe and of adjusting the scrapers for variations in the diameters of the pipes and to compensate for the wearing of the scrapers; also to improve apparatus of this kind in other respects hereinafter specified.

In the accompanying drawings—

Fig. 1 is a plan view of an apparatus embodying our invention.

Fig. 2 is a central sectional view of one unit of the apparatus on an enlarged scale.

Fig. 3 is an end view thereof.

Fig. 4 is a sectional elevation thereof on line 4—4, Fig. 2.

Figs. 5 and 6 are transverse sectional views thereof on lines 5—5 and 6—6, Fig. 2.

Fig. 7 is a longitudinal central sectional elevation of a plunger adapted to be secured to the rear end of the cleaning apparatus to enable the apparatus to be forced through the pipe by means of fluid pressure.

The apparatus may consist of any number of units secured one behind the other and adapted to be moved lengthwise through the pipe to be cleaned. Each of the units includes a centrally extending rod or shaft on which the parts of the apparatus are mounted, the central rod or shaft A of the front member shown in Fig. 1 being connected to the rod or shaft A' of the rear member by means of any suitable universal coupling or joint, that shown including a connecting member $a$ which is pivoted at one end to the rear end of the rod or shaft A and at its other end to an extension $a'$ of the rod or shaft A' of the second unit. Any other suitable connection which permits the shafts to extend at any angle with reference to each other and which at the same time is capable of transmitting rotary motion from one shaft to another may be employed.

The scraping of the interior surface of a pipe to be cleaned is effected by means of a plurality of scrapers or scraping blades B which are preferably made of resilient material such as steel, and the outer edges $b$ of which are shaped to conform to the curvature of the inner surface of the pipe to be cleaned. The inner ends of the scrapers are adapted to be removably secured to a supporting member or head C by any suitable means such as bolts $b'$, and the scrapers are preferably curved or flared outwardly from their inner ends to their outer ends.

Each of the supporting members or heads C is suitably mounted on the central rod or shaft of the apparatus in any suitable manner. For example, in the construction shown each head C is provided with an internally threaded axially extending hole which is adapted to engage with a screw threaded portion D of the central rod or shaft. Each head is also provided with a forwardly extending annular flange $c$ through which the bolts $b'$ extend.

The means employed for varying the tension of the scraper blades against the inner surface of the pipe to be cleaned are preferably constructed as follows: An outwardly extending expansion member such as a ring or flange E is adapted to engage the outwardly flaring portions of the scrapers intermediate of the ends thereof and this ring or flange is preferably secured to the central rod or shaft of the apparatus, and the expansion ring E and the supporting member or head C of each set of scrapers are adjustable toward and from each other so as to vary the tension of the scrapers B. In the particular construction shown the head C and ring E are made adjustable relatively to each other by means of the threaded connection of the head with the central shaft, and since the portions of the scrapers which are engaged by the ring or flange E flare outwardly, it will be obvious that greater or less tension may be exerted by the scrapers against the inner face of the pipe, depending upon the relative positions of the ring or flange E with reference to the head C. In the particular construction shown the ring E is arranged about a sleeve or collar F having a flange $f$ against which the ring E abuts, and a second sleeve or collar G engages the other face of the ring E and holds the same against the flange $f$. The two sleeves or collars F and G are secured to the central rod or shaft of the apparatus by means of a bolt $g$ so that these two sleeves or collars together with the ring E will be held against endwise movements on the central rod or shaft. By means of this construction the ring E and the shaft are rotatable relatively to each other. Consequently when the shaft is rotated while the device is positioned in a pipe, the shaft will advance longitudinally of the relatively stationary head C, while the ring E moves relatively to the scrapers to adjust the same. Since the shaft may be turned without turning the ring, the only relative movement between the scrapers and the ring E is a longitudinal movement. If the apparatus is provided with scrapers of different shapes to cooperate with a pipe of different diameter, the ring E may also, if desired, be removed and be replaced by a ring of different diameter by releasing the bolt $g$ and removing the sleeve or collar G, whereupon the ring may readily be removed lengthwise of the central rod or shaft of the apparatus. The expansion ring also has the advantage of bracing or supporting the scrapers intermediate of their ends so that the scrapers may exert greater tension against the pipe than would be the case if the scrapers were supported at their ends only. Other means for varying the tension or pressing the scrapers outwardly may be provided, if desired.

It will be obvious that any one set of scrapers B cannot operate upon the entire inner surface of a pipe to be cleaned since a certain amount of space must be left between adjacent scrapers to permit of the necessary radial adjustment of the scrapers. For this purpose each unit of the apparatus consists of two or more separate sets of scrapers arranged one in advance of the other, and means are provided for insuring an arrangement of the scrapers whereby the rear set of scrapers will clean those portions of the pipe which are not acted upon by the set or sets of scrapers in the front of the rear set of a unit. In the construction shown for this purpose, means are provided for maintaining the different sets of scrapers of a unit in such relation to each other that the scrapers of adjacent sets will be staggered. In the construction shown for this purpose a key member is provided having a substantially flat body or shank portion H, provided at one end with an outwardly extending key portion $h$ which extends between two adjacent scrapers B of one of the sets of scrapers and the other end of the shank portion H is secured to the supporting member or head C of another set of scrapers, preferably by one of the bolts $b'$ which also serves to hold a scraper on the head C. By means of this arrangement it will be obvious that the scrapers of one set of scrapers will be arranged in staggered relation with reference to the other set of any unit, so that each unit of a cleaning apparatus will scrape the entire surface of a pipe.

In order to facilitate the insertion of a cleaning apparatus into a pipe, the scrapers of the several units of the apparatus are adjusted to a diameter considerably less than that of the pipe to be cleaned, so that the apparatus can be readily inserted into the pipe. After the apparatus has been positioned in the pipe, a socket wrench is placed into engagement with the rear end I of the last central rod or shaft A' of the apparatus so that all of the shafts of the apparatus may be turned through the medium of the universal joints or couplings between the shafts. This turning of the shafts moves the shafts lengthwise relatively to the supporting members or heads C, carrying the expansion members or rings E with the shafts so that the scrapers may be placed under the desired tension. By means of this arrangement whereby the scrapers can be adjusted after the same are placed into a pipe line, the insertion of the apparatus into a pipe is very greatly facilitated.

When the apparatus is to be drawn through a pipe by means of a cable, rope or other means, it is desirable to provide means for preventing the twisting of the cable or rope from turning the central rods or shafts of the apparatus and thus vary the tension of the scrapers, and also to prevent the turning of the shafts during the adjustment of the cleaning device from twisting the cable or rope, and for this purpose a clevis K or other attachment to which the cable or rope may be secured is so mounted that it may turn relatively to the shaft A of the front unit of the apparatus. In the construction shown for this purpose a sleeve $k$ is bolted or otherwise secured to the front end of the shaft or rod A, and the sleeve $k$ is provided at its front end with an outwardly extending annular flange $k'$, which extends into a second sleeve $k^2$ having an inwardly extending annular flange $k^3$. By means of this arrangement of the annular flanges it will be obvious that the sleeve $k^2$ may turn relatively to the sleeve $k'$. In order to hold the two sleeves in proper relation to each other a stud $k^4$ is used, one end of which is adapted to fit into the sleeve $k^2$ and to be secured in place therein by means of a bolt or the like $k^5$, the other end of the stud being provided with a hole through which the bolt of the clevis K may pass. The rear end of the sleeve $k$ also acts as a stop to limit the extent to which the supporting member or head C can be moved away from the expansion member E by the turning of the shaft. Movement of the supporting member in the other direction is limited by the rear end of the supporting member engaging the sleeve or collar F.

In case it is desired to utilize the pressure of the liquid in the pipe to force the apparatus through a pipe line, a plunger may be provided as shown in Fig. 7, the plunger being indicated by L and may be made of leather, rubber or other suitable flexible material and is shaped to conform to the inner face of the scraper blades B of the rear set of scrapers and to press against these blades. In this construction an expansion ring or flange E' is provided, which corresponds substantially to the expansion ring E heretofore described, and which is held in place by sleeves or collars F' and G'. The plunger is preferably held in correct relation to the apparatus by means of a clamping ring M which is adapted to be secured by means of screws or other fastening devices m to the expansion ring or flange E'. In this case the expansion ring at the rear end of the scraper is preferably provided with a plurality of holes which are normally closed by means of spring pressed valves N which are held in the seats formed by the holes in the expansion ring E', by means of springs n or the like. The clamping ring M is also provided with holes m' in alinement with the holes in the expansion ring, so that liquid under pressure can flow through these holes and force the valves N off their seats, and thereby wash out material which has been removed from the pipe by means of the scrapers. The fastening devices m which hold the clamping ring M in place preferably also secure spring leaves or plates O to the clamping ring. These spring leaves or plates conform substantially to the inner face of the plunger L and hold the same against the scraping blades B. By means of this construction the plunger may be secured to the apparatus without any material change therein, so that the apparatus can either be drawn through a pipe by means of a cable or rope or can be forced through the pipe by means of the pressure of the liquid in the pipe, or both of these means may be employed in conjunction with each other. It will be noted that by mounting the plunger on the expansion ring or member E' and supporting the same on the scrapers B, the shaft of the apparatus can be freely turned for adjusting the scrapers without turning the plunger. Any liquid pressure acting on the plunger also tends to press the scrapers against the pipe. A plunger of other construction can, of course, be employed if desired.

In order to deflect the liquid which is projected through the openings in the plunger and expansion ring E' outwardly against the inner wall of the pipe, the rear face of the supporting member or head C which is arranged close to the plunger L is of frusto conical shape so that any liquid striking this face will be deflected outwardly toward the inner surface of the pipe. The other heads or supporting members have also been formed in this manner so that some of the liquid projected against the conical heads will be deflected outwardly. In order to assist the liquid in flowing against the conical face of the supporting members or heads, holes or openings e are preferably provided in all of the expansion rings E through which the liquid may flow, valves N being used only on the last expansion ring at the rear end of the apparatus. The conical faces also serve to clear the spaces between the supporting members and the expansion rings of accumulations of solid matter removed from the pipe. In the use of the pipe cleaning apparatus, the expansion members E also have the property of acting to a certain extent like plungers to assist in forcing the apparatus through a pipe.

We claim as our invention:

1. In a pipe cleaning device, the combination of a central shaft, a plurality of scraper supporting members rotatably mounted on said shaft and adjustable longitudinally on said shaft, each of said members supporting a set of scrapers which flare outwardly from said supporting members into engagement with the inner wall of a pipe, and means for holding said supporting members against turning relatively to each other and against longitudinal movement relatively to each other, whereby the scrapers of one member are held in fixed relation with reference to the scrapers of another member.

2. In a pipe cleaning device, the combination of a central shaft, a plurality of sets of scraper blades arranged about said shaft and flaring outwardly therefrom, and means connecting adjacent sets of scraper blades to hold the same in staggered relation and against turning relatively to each other about said shaft, said means being detachable without moving said sets of scraper blades relatively to each other.

3. In a pipe cleaning device, the combination of a central shaft, a plurality of sets of scraper blades relatively to which said shaft is rotatable and which are adjustable on said shaft, and a part secured to one of said sets of scraper blades and having a portion which extends between two blades of an adjacent set of scraper blades to hold the blades of said two sets in staggered relation with reference to each other in any adjustment of said sets of blades relatively to each other.

4. In a pipe cleaning device, the combination of a central shaft, a plurality of scraper supporting members mounted on said shaft and having a screw threaded connection therewith to permit said members to be adjusted lengthwise of said shaft relatively to each other, each of said members supporting a set of scrapers which flare outwardly from said supporting members, and means associated with said supporting members which hold the same against lengthwise and circumferential adjustment relatively to each other.

5. In a pipe cleaning device, the combination of a plurality of central shafts, a universal coupling connecting adjacent shafts, a pair of sets of scraper blades mounted on each shaft, means for maintaining the blades of said two sets of scraper blades in staggered relation with reference to each other, whereby the entire inner surface of a pipe will be acted upon by the scrapers mounted on each shaft, and means actuated by the turning of all of said shafts through said universal joints relatively to said sets of scraper blades for simultaneously adjusting the tension with which said scraper blades act on the inner wall of a pipe.

6. In a pipe cleaning device, the combination of a plurality of supporting members, each having a set of scraping blades mounted thereon, a central shaft which is adjustable relatively to said supporting members, and a key member secured to one of said supporting members and having a part extending between a pair of scraping blades of an adjacent set to hold the blades of one set in staggered relation to the blades of another set.

7. In a pipe cleaning device, the combination of a plurality of supporting members, each having a set of scraping blades mounted thereon, a plunger arranged at the rear end of said device and adapted to fit into the pipe to be cleaned and having openings therein through which liquid under pressure may pass, and substantially frusto-conical rear faces on said supporting members which are adapted to deflect liquid projected against the same outwardly toward the inner surface of the pipe.

8. In a pipe cleaning device, the combination of a plurality of supporting members each having a set of scraping blades mounted thereon, an expansion member on said shaft in rear of each supporting member and cooperating with said blades to move the ends of said blades radially and provided with apertures through which liquid may flow, and substantially frusto-conical rear faces on said supporting member which are adapted to deflect liquid passing through said apertures toward the inner face of the pipe.

9. In a pipe cleaning device, the combination of means for moving the same through a pipe, a shaft to which said means are connected, scrapers mounted on said shaft, means actuated by the rotation of said shaft to adjust said scrapers relatively to the pipe, and a connection between said shaft and said means for moving the same through the pipe whereby said shaft may be turned without turning said moving means.

10. In a pipe cleaning device, the combination of a central shaft, means secured to the front end of said shaft for pulling the device through a pipe, scrapers mounted on said shaft, means on said shaft for adjusting said scrapers relatively to the pipe, whereby the turning on said shaft produces the adjustment of said scrapers, and a swivel connection between said shaft and said means for pulling said device through a pipe, whereby the turning of the shaft to adjust the scrapers will not be transmitted to said pulling means.

11. In a pipe cleaning device, the combination of a central shaft, scrapers mounted on said shaft, means mounted on said shaft for adjusting said scrapers toward and from said shaft when said shaft is turned, a plunger arranged at the rear end of said device whereby liquid pressure in the pipe acting on the plunger tends to force the said device through a pipe, and a swivel connection between said shaft and said plunger whereby said shaft may be turned without turning said plunger.

12. In a pipe cleaning device, the combination of a central supporting shaft, a plurality of sets of scraping blades mounted on said shaft and adapted to engage the inner wall of a pipe for cleaning the same, means actuated by the turning of the shaft for varying the tension of said scraping blades on the walls of the pipe, means for connecting a cable to the front end of said cleaning device, and a swivelled connection between said connecting means and said shaft whereby the cable may twist without varying the adjustment of the tension of said scrapers by turning said shaft.

13. In a pipe cleaning device, the combination of a central shaft, scrapers mounted on said shaft, expansion members mounted on said shaft for adjusting the scrapers toward and from said shaft, means actuated by the turning of said shaft to move said scrapers and expansion members relatively to each other to effect adjustment of said scrapers, and a plunger mounted on one of said expansion members and adapted to be acted upon by the pressure of the liquid in the pipe to move the cleaning device through the pipe.

14. In a pipe cleaning device the combination of a central shaft, scrapers mounted on said shaft, an expansion member adapted to act on the scrapers to adjust the same relatively to the shaft, and means connected with said expansion member and adapted to be acted upon by the pressure of the liquid in the pipe in a direction to move said pipe cleaning device through the pipe.

JOHN M. THOMPSON.
WILLIAM H. THOMPSON.